E. Copleston.
Hats & Caps.

Nº 61403.     Patented Jan. 22, 1867.

Witnesses         Inventor
C. L. Topliff       Edwin Copleston
Henry Morris    per Munn & Co.
                            Attorneys

United States Patent Office.

EDWIN COPLESTON, OF WRENTHAM, MASSACHUSETTS.

Letters Patent No. 61,403, dated January 22, 1867.

IMPROVEMENT IN COVERINGS FOR THE HEAD.

The Schedule referred to in these Letters Patent and making part of the same.

TO ALL WHOM IT MAY CONCERN:

Be it known that I, EDWIN COPLESTON, of Wrentham, in the county of Norfolk, and State of Massachusetts, have invented a new and useful Improvement in the Manufacture of Head-Coverings; and I do hereby declare that the following is a full, clear, and exact description thereof, which will enable others skilled in the art to fully understand and use the same, reference being had to the accompanying drawing, forming part of this specification, in which—

Similar letters of reference indicate like parts.

Figure 1:
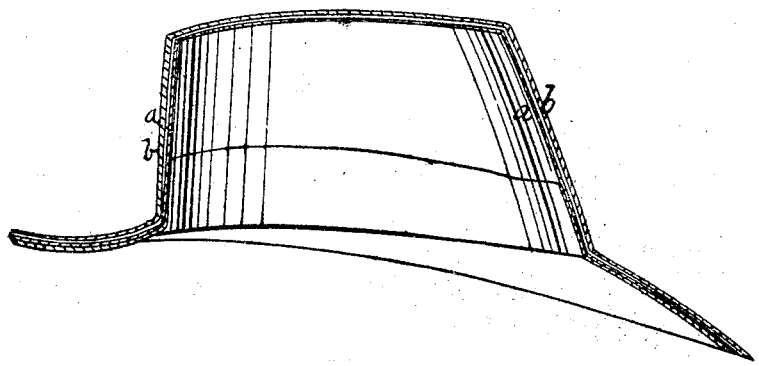
Figure 1 is a vertical section of this invention, taken in the plane indicated by the line x x, fig. 2.
Figure 2:
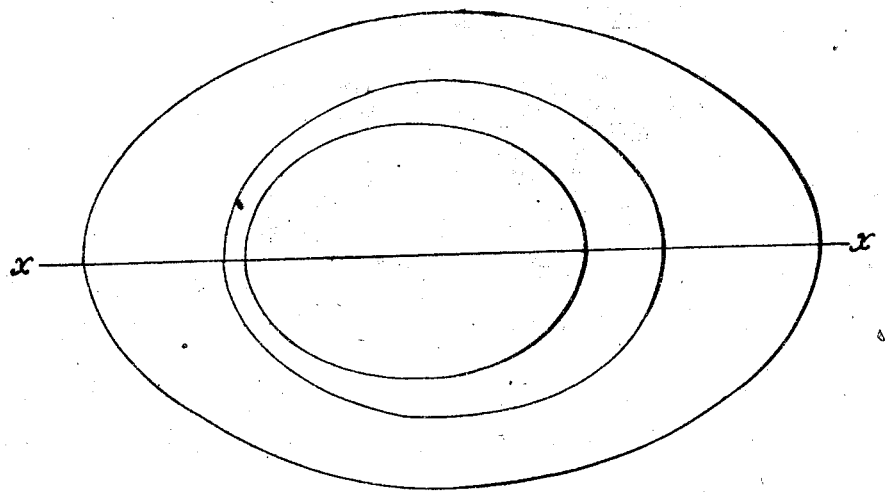
Figure 2 is a plan or top view of the same.

This invention consists in a head-covering, the foundation of which is made of cloth, buckram, muslin, or any other fabric or composition capable of being stamped or formed into head-coverings, from one or more pieces stuck together by means of glue, or any other suitable cement, and treated with a composition of starch and oil, and which, after it has been pressed in the desired form, is covered with suitable varnish, and with flock made from wool, or any fibrous material, such as hemp, cotton, flax, silk, or a combination of the same.

The way in which I propose to execute my invention is as follows: First, spread the double buckram (made of a fine and coarse piece stuck together) on a table, with the coarse side up; now apply strong glue by means of a brush; having given the cloth a good coat, dry it and then apply the second coat, and immediately spread a fine piece of buckram or muslin on the glued surface. Press out the creases, so as to have it adhere evenly, with a cloth, or sponge covered with cloth, and by these means a piece of cloth is obtained with three-ply which has two fine sides. After this cloth is well dried, it is spread as usual, and a thick coat of starch and linseed oil is applied with a brush to both sides of the cloth. The starch is to be made as thick as possible, that is, so as to be able to spread it with a brush; and while the starch is hot the oil is added, and stirred freely until it is well incorporated. The composition is to be used cold. The proportion of oil and starch used in this composition is about as follows: good thick starch, one quart; linseed oil, two table-spoons full. The oil is necessary to prevent the cloth from sticking to the dies, and the oil and starch together give a smooth and glossy surface to the hat, which is very essential in the next operation. After the starch has been applied and the cloth is dry, it is cut up into suitable pieces for stamping out the frames or bodies; and in order to effect this purpose, the cloth is moistened with cold water, so as to enable it to stretch and contract as required in forming the frames or bodies on the warm dies. In some shapes it is practicable to make the dies to fit close, so as to press the bodies smooth, and form them at one operation; but where this cannot be done, they must be pressed after they leave the dies. After the frame or body is pressed, it is varnished with any quick-drying varnish, which must be water-proof, and composed in such a manner that it will not affect or dissolve the starch and glue sizing in the frame, or cause the frame to warp out of shape, and the smooth surface to become rough. Common white varnish and Japanese varnish answer very well; and a little linseed oil, made very drying with litharge, may be added to the above varnishes, or all three may be put together. Varnish containing alcohol or water must not be used, as it affects the sizing. A pigment must be added to the varnish of a color to match the color of the flock which is to be applied; it can be ground up with the drying oil, and then added to the varnish, and it is best to select the lightest pigments, such as zinc white in preference to white lead, and so on. After the first coat of varnish and pigment have been applied inside and out of the hat, it is left to dry, and it is now about water-proof. It is then again varnished on the inside only with the same kind of varnish, and while wet the flock is sprinkled on it with the hand or with a small fine sieve, and by tapping the hat on the outside, or by shaking, the flock is caused to adhere evenly, and after it is well covered the surplus flock is removed by shaking, and the hat is left to dry. After that, the outside of the hat is treated in the same manner, and when quite dry it is lightly brushed with a soft brush back and forth, and after trimming up the edges, the head-covering is finished. If the edges show white when cut, they must be inked with suitable color of ink.

A head-covering, constructed according to this invention, is represented in the drawing. The two layers, a b, of the buckram and muslin are united by suitable cement, and covered with flock, and a light, cheap, and durable head-covering is thus produced.

I claim as new, and desire to secure by Letters Patent—

A head-covering, produced as herein described, as a new article of manufacture.

EDWIN COPLESTON.

Witnesses:
SAM'L WARNER,
ANNA N. SCOTT.